(12) United States Patent
Eiraku

(10) Patent No.: US 8,577,580 B2
(45) Date of Patent: Nov. 5, 2013

(54) CONTROL DEVICE FOR INTERNAL COMBUSTION ENGINE

(75) Inventor: Akira Eiraku, Sunto-gun (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 491 days.

(21) Appl. No.: 13/000,060

(22) PCT Filed: Feb. 26, 2010

(86) PCT No.: PCT/JP2010/053053
§ 371 (c)(1),
(2), (4) Date: Dec. 20, 2010

(87) PCT Pub. No.: WO2011/104854
PCT Pub. Date: Sep. 1, 2011

(65) Prior Publication Data
US 2011/0213539 A1    Sep. 1, 2011

(51) Int. Cl.
*G06F 19/00* (2011.01)
*G06G 7/70* (2006.01)
*F02D 23/00* (2006.01)
*F02B 47/08* (2006.01)
*F02M 25/07* (2006.01)

(52) U.S. Cl.
USPC .................. 701/102; 60/602; 123/568.11

(58) Field of Classification Search
USPC .............. 60/602, 605.1, 605.2; 123/568.11; 701/100, 101, 102, 103, 107, 108
See application file for complete search history.

(56) References Cited

U.S. PATENT DOCUMENTS

| 5,289,683 | A  | * | 3/1994 | Kurihara | 60/602 |
| 7,788,922 | B2 | * | 9/2010 | Muller | 60/602 |
| 2003/0182049 | A1 | * | 9/2003 | Bale et al. | 701/108 |
| 2007/0033936 | A1 | * | 2/2007 | Panciroli | 60/602 |
| 2011/0099997 | A1 | * | 5/2011 | Singh et al. | 60/602 |

FOREIGN PATENT DOCUMENTS

| JP | 2001-193573 A | 7/2001 |
| JP | 2004-100694 A | 4/2004 |
| JP | 2006-022763 A | 1/2006 |
| JP | 2008-309004 A | 12/2008 |
| JP | 2009-197738 A | 9/2009 |

* cited by examiner

*Primary Examiner* — Stephen K Cronin
*Assistant Examiner* — Sizo Vilakazi
(74) *Attorney, Agent, or Firm* — Kenyon & Kenyon LLP

(57) ABSTRACT

Disclosed is an internal combustion engine control device that is capable of accurately estimating a turbine flow rate during a transient operation of an internal combustion engine with a turbocharger having a WGV. Steps are performed to acquire an exhaust gas flow rate mcyl (=mB), a WGV opening WG (=X), and a turbine rotation speed Ntb (=Na) during the transient operation of the internal combustion engine. Steps are then performed to calculate the turbine flow rate (=mtA) and exhaust gas flow rate mcyl (=mA), which prevail when the turbine rotation speed Ntb and WGV opening WG acquired during the transient operation are achieved during a steady operation. Next, a step is performed to calculate the turbine flow rate (=mtB) during the transient operation by applying the flow rate ratio of mtA to mA to the exhaust gas flow rate mcyl during the transient operation. Preferably, the turbine rotation speed Ntb during an Ntb transient operation is estimated by using a turbine flow rate change amount Δmt (=mtB−mtA) during the transient operation.

10 Claims, 7 Drawing Sheets

US 8,577,580 B2

CONTROL DEVICE FOR INTERNAL COMBUSTION ENGINE

This is a 371 national phase application of PCT/JP2010/053053 filed 26 Feb. 2010, the content of which is incorporated herein by reference.

TECHNICAL FIELD

The present invention relates to a control device for an internal combustion engine, and more particularly, to a control device for an internal combustion engine with a turbocharger having a wastegate valve (WGV).

BACKGROUND ART

A conventional technology proposed, for instance, in JP-A-2006-22763 uses a turbocharger model to calculate boost pressure from exhaust characteristics. More specifically, this technology uses a turbine model to calculate turbine motive power from exhaust characteristics, and uses a shaft model to convert the turbine motive power to compressor motive power with a predetermined conversion efficiency. Further, a compressor model is used not only to calculate supercharging power which is actually used for supercharging, from the compressor motive power, but also to estimate the boost pressure from the supercharging power.

PRIOR ART LITERATURE

Patent Documents

Patent Document 1: JP-A-2006-22763
Patent Document 2: JP-A-2008-309004
Patent Document 3: JP-A-2001-193573

SUMMARY OF THE INVENTION

Problem to be Solved by the Invention

Meanwhile, turbochargers have a wastegate valve (WGV) for bypassing part of exhaust gas flowing into a turbine. The flow rate ratio between the flow rate of exhaust gas flowing into the turbine (hereinafter referred to as the "turbine flow rate") and the flow rate of exhaust gas bypassing the turbine (hereinafter referred to as the "WGV flow rate") can be changed by adjusting the opening of the WGV. The exhaust gas bypassing the turbine becomes discharged without working in the turbine. Therefore, increasing the WGV flow rate makes it possible to decrease the rate of boost pressure increase and raise exhaust temperature. As described above, engine state quantities such as the boost pressure and exhaust gas temperature can be accurately controlled by controlling the WGV opening in a linear manner.

When the WGV is to be used for the aforementioned control purposes, however, it is preferred that the turbine flow rate, exhaust gas temperature, and other exhaust gas state quantities be accurately grasped during a transient operation during which internal combustion engine speed and load vary. However, the turbine model used with the above-described conventional technology does not assume that a turbocharger having a wastegate valve (WGV) is used. Consequently, the above-described conventional technology cannot accurately estimate the turbine flow rate and other exhaust gas state quantities during the transient operation of an internal combustion engine.

The present invention has been made to address the above problem. An object of the present invention is to provide an internal combustion engine control device that is capable of accurately estimating the turbine flow rate during the transient operation of an internal combustion engine with a turbocharger having a WGV.

Means for Solving the Problem

In accomplishing the above object, according to a first aspect of the present invention, there is provided a control device for an internal combustion engine with a turbocharger, the control device including: an exhaust bypass path that is installed in an exhaust system for the internal combustion engine to bypass the turbocharger; a WGV that is installed in the exhaust bypass path and capable of arbitrarily adjusting the opening thereof upon receipt of an operation request from the internal combustion engine; acquisition means for acquiring, during a transient operation of the internal combustion engine, an exhaust gas flow rate of exhaust gas discharged from the internal combustion engine, a WGV opening, and a boost pressure correlation value having a correlation with boost pressure of the internal combustion engine as a transient exhaust gas flow rate, a transient WGV opening, and a transient boost pressure correlation value, respectively; virtual exhaust gas flow rate acquisition means for acquiring, as a virtual exhaust gas flow rate, a virtual value indicative of the exhaust gas flow rate prevailing when the transient boost pressure correlation value and the transient WGV opening are achieved during a steady operation of the internal combustion engine; virtual turbine flow rate acquisition means for acquiring, as a virtual turbine flow rate, a virtual value indicative of a flow rate of exhaust gas passing through a turbine for the turbocharger (hereinafter referred to as a turbine flow rate), the virtual value prevailing when the transient boost pressure correlation value and the transient WGV opening are achieved during the steady operation; flow rate ratio acquisition means for acquiring a flow rate ratio of the virtual turbine flow rate to the virtual exhaust gas flow rate; and turbine flow rate calculation means for calculating the turbine flow rate during the transient operation by applying the flow rate ratio to the transient exhaust gas flow rate.

According to a second aspect of the present invention, there is provided the control device as described in the first aspect, further including WGV flow rate calculation means for acquiring a value obtained by subtracting the turbine flow rate during the transient operation from the transient exhaust gas flow rate as the flow rate of exhaust gas passing through the WGV (hereinafter referred to as a WGV flow rate) during the transient operation.

According to a third aspect of the present invention, there is provided the control device as described in the first or second aspect, wherein the virtual exhaust gas flow rate acquisition means includes steady operation map storage means for storing a steady operation map defining a relationship during the steady operation between the boost pressure correlation value, the WGV opening, and the exhaust gas flow rate, and wherein the virtual exhaust gas flow rate acquisition means uses the steady operation map to acquire an exhaust gas flow rate corresponding to the transient boost pressure correlation value and the transient WGV opening as the virtual exhaust gas flow rate.

According to a fourth aspect of the present invention, there is provided the control device as described in any one of the first to third aspects, wherein the virtual turbine flow rate acquisition means includes steady operation map storage means for storing a steady operation map defining the relationship during the steady operation between the boost pressure correlation value, the WGV opening, and the exhaust gas flow rate, and wherein the virtual turbine flow rate acquisition means uses the steady operation map to acquire an exhaust gas flow rate corresponding to the transient boost pressure correlation value and the WGV opening of a fully-closed as the virtual turbine flow rate.

According to a fifth aspect of the present invention, there is provided the control device as described in any one of the first to fourth aspects, wherein the boost pressure correlation value is a turbine rotation speed of the turbocharger; and wherein the acquisition means includes turbine flow rate change amount acquisition means for acquiring a value obtained by subtracting the virtual turbine flow rate from the turbine flow rate during the transient operation as a turbine flow rate change amount, and estimation means for estimating the turbine rotation speed in accordance with the turbine flow rate change amount.

According to a sixth aspect of the present invention, there is provided the control device as described in any one of the first to fifth aspects, wherein the transient operation includes an operation in which the exhaust gas flow rate changes while the WGV opening remains unchanged.

According to a seventh aspect of the present invention, there is provided the control device as described in any one of the first to fifth aspects, wherein the transient operation includes an operation in which the WGV opening changes while the exhaust gas flow rate remains unchanged.

According to an eighth aspect of the present invention, there is provided the control device as described in any one of the first to seventh aspects, further including: temperature map storage means for storing a temperature map defining a relationship during a steady operation of the internal combustion engine between the boost pressure correlation value, the exhaust gas flow rate, and an exhaust gas temperature prevailing downstream of the turbocharger; virtual boost pressure correlation value acquisition means for acquiring, as a virtual boost pressure correlation value, a virtual value indicative of a boost pressure correlation value prevailing when the turbine flow rate during the transient operation and the transient exhaust gas flow rate are achieved during the steady operation; and exhaust gas temperature identification means for identifying, as the exhaust gas temperature prevailing during the transient operation, the temperature of an associated point of the temperature map by using the virtual boost pressure correlation value and the transient exhaust gas flow rate.

According to a ninth aspect of the present invention, there is provided the control device as described in the eighth aspect, wherein the virtual boost pressure correlation value acquisition means includes steady operation map storage means for storing a steady operation map defining the relationship during the steady operation between the boost pressure correlation value, the WGV opening, and the exhaust gas flow rate, and wherein the virtual boost pressure correlation value acquisition means acquires, as the virtual boost pressure correlation value, a boost pressure correlation value corresponding to a point at which the WGV opening is fully closed and the exhaust gas flow rate is equal to the turbine flow rate during the transient operation, the point being on the steady operation map.

Advantages of the Invention

According to the first aspect of the present invention, the boost pressure correlation value, exhaust gas flow rate, and WGV opening during the transient operation of the internal combustion engine are acquired. The flow rate ratio of the turbine flow rate to the exhaust gas flow rate during the transient operation is equivalent to a flow rate ratio that prevails when the boost pressure correlation value and WGV opening during the transient operation are achieved during a steady operation. Therefore, the turbine flow rate during the transient operation can be accurately calculated by applying the flow rate ratio during the steady operation to the amount of exhaust gas obtained during the transient operation.

According to the second aspect of the present invention, the WGV flow rate during the transient operation can be accurately calculated by subtracting the turbine flow rate from the exhaust gas flow rate during the transient operation.

According to the third aspect of the present invention, the steady operation map defines the relationship during the steady operation between the boost pressure correlation value, the WGV opening, and the exhaust gas flow rate. Therefore, the third aspect of the present invention makes it possible to accurately calculate the virtual value of the exhaust gas flow rate by using the steady operation map.

According to the fourth aspect of the present invention, the steady operation map defines the relationship during the steady operation between the boost pressure correlation value, the WGV opening, and the exhaust gas flow rate. The exhaust gas flow rate corresponding to a point at which the WGV is fully closed on the steady operation map indicates the turbine flow rate. Therefore, the fourth aspect of the present invention makes it possible to accurately calculate the virtual value of the turbine flow rate by using the steady operation map.

According to the fifth aspect of the present invention, the amount of turbine rotation speed change during the transient operation is proportional to the turbine flow rate change amount that is obtained by subtracting the virtual turbine flow rate from the turbine flow rate during the transient operation. Therefore, the fifth aspect of the present invention makes it possible to accurately estimate the turbine rotation speed during the transient operation in accordance with the turbine flow rate change amount.

According to the sixth aspect of the present invention, the turbine flow rate during the transient operation can be accurately calculated during the transient operation in which the exhaust gas flow rate changes while the WGV opening remains unchanged.

According to the seventh aspect of the present invention, the turbine flow rate during the transient operation can be accurately calculated during the transient operation in which the exhaust gas flow rate changes while the exhaust gas flow rate remains unchanged.

According to the eighth aspect of the present invention, the virtual value of the boost pressure correlation value prevailing when the turbine flow rate during the transient operation and the transient exhaust gas flow rate are achieved during the steady operation is identified. Further, the exhaust gas temperature prevailing downstream of the turbocharger, which corresponds to the virtual boost pressure correlation value and transient exhaust gas flow rate is identified from the temperature map. Therefore, the eighth aspect of the present invention makes it possible to accurately estimate the exhaust gas temperature prevailing downstream of the turbocharger during the transient operation without performing complex calculations.

According to the ninth aspect of the present invention, the steady operation map defines the relationship during the steady operation between the boost pressure correlation value, the WGV opening, and the exhaust gas flow rate. The exhaust gas flow rate corresponding to a point at which the WGV opening is fully closed on the steady operation map indicates the turbine flow rate. Therefore, the ninth aspect of the present invention makes it possible to acquire, as the virtual boost pressure correlation value, a boost pressure correlation value corresponding to a point at which the WGV opening is fully closed and the exhaust gas flow rate is equal to the turbine flow rate during the transient operation, the point being on the steady operation map.

MODE FOR CARRYING OUT THE INVENTION

Figure 1:
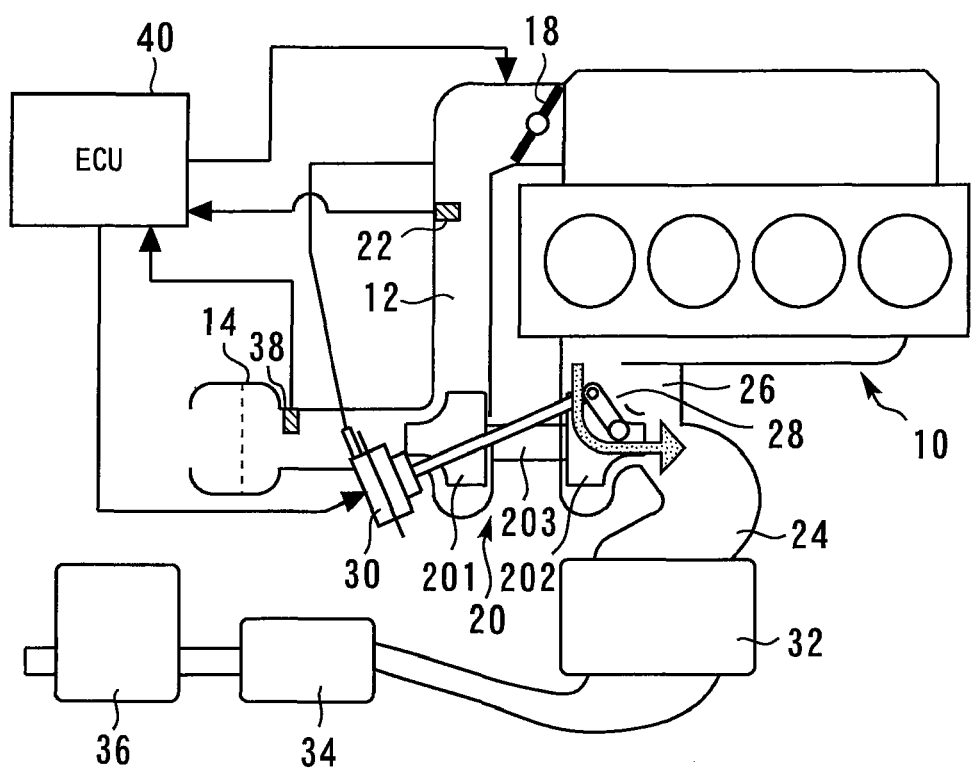
FIG. 1 is a schematic diagram illustrating the configuration of a system according to an embodiment of the present invention.

Embodiments of the present invention will now be described with reference to the accompanying drawings. Like elements in the drawings are designated by like reference numerals and will not be redundantly described. The present invention is not limited by the embodiments described below.
First Embodiment
[Configuration of First Embodiment]
FIG. 1 is a schematic diagram illustrating the configuration of a system according to an embodiment of the present invention. An intake system for an internal combustion engine 10 includes an intake path 12. Air is taken into the intake path 12 from the atmosphere and delivered to a combustion chamber for each cylinder. An air cleaner 14 is installed at the inlet of the intake path 12. An air flow meter 38 is installed in the intake path 12 positioned downstream of the air cleaner 14 to detect an intake air amount.

A turbocharger 20 is installed downstream of the air cleaner 14. The turbocharger 20 includes a compressor 201 and a turbine 202. The compressor 201 and the turbine 202 are integrally coupled with a connecting shaft 203. The compressor 201 is rotationally driven by exhaust energy of exhaust gas input into the turbine 202.

A throttle valve 18 is disposed downstream of the compressor 201. The throttle valve 18 is an electronically controlled valve that is driven by a throttle motor in accordance with an accelerator opening. A pressure sensor 22 is disposed in the intake path 12 positioned upstream of the throttle valve 18 to detect a boost pressure.

An exhaust system for the internal combustion engine 10 includes an exhaust path 24. The turbine 202 of the turbocharger 20 is installed in the middle of the exhaust path 24. Further, an exhaust bypass path 26 is connected to the exhaust path 24 of the internal combustion engine 10 as shown in FIG. 1. The exhaust bypass path 26 bypasses the turbine 202 to establish a connection between the inlet and outlet of the turbine 202. A wastegate valve (WGV) 28 is disposed in the middle of the exhaust bypass path 26. When the WGV 28 opens, part of exhaust gas bypasses the turbine 202 of the turbocharger 20 and becomes discharged. The WGV 28 is driven by an actuator 30 so that the opening of the WGV 28 is electronically controlled.

In addition, an SC catalyst 32 and a UF catalyst 34 are disposed in the exhaust path 24 positioned downstream of the turbine 202. As viewed from the upstream side, the SC catalyst 32 and the UF catalyst 34 are disposed in the order named. Three-way catalysts may be used as these catalysts 32 and 34. Furthermore, a muffler 36 is disposed in the exhaust path 24 positioned downstream of the UF catalyst 34.

As shown in FIG. 1, the system according to the present embodiment includes an ECU (electronic control unit) 40. An input section of the ECU 40 is electrically connected not only to the above-mentioned air flow meter 38 and pressure sensor 22 but also to various other sensors controlling the internal combustion engine 10. An output section of the ECU 40 is connected to various actuators such as the above-mentioned actuator 30 and throttle valve 18. The ECU 40 controls the operating status of the internal combustion engine 10 in accordance with various items of input information.
[Operation of First Embodiment]
An operation of the first embodiment will now be described with reference to FIGS. 2 and 3. First of all, a method of calculating the mass flow rate of exhaust gas flowing toward the turbine 202 (turbine flow rate) and the flow rate of exhaust gas flowing toward the WGV 28 (WGV flow rate) during a steady operation of the internal combustion engine 10, that is, while state quantities concerning the operating status of the internal combustion engine 10 are in equilibrium, will be described.

Figure 2:
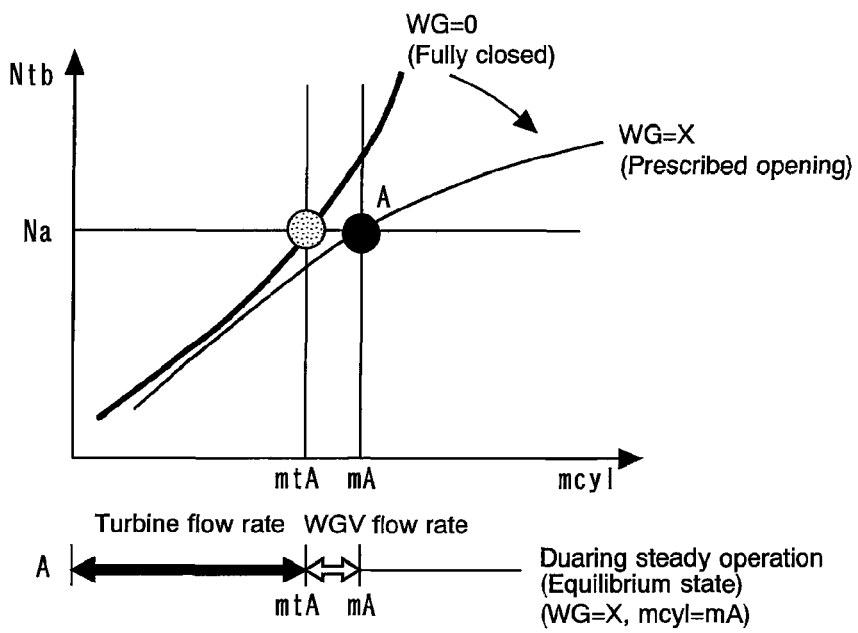
FIG. 2 is a diagram illustrating the relationship during a steady operation between an exhaust gas mass flow rate mcyl, a turbine rotation speed Ntb, and a WGV opening WG.

FIG. 2 is a diagram illustrating the relationship during a steady operation of the internal combustion engine 10 between an exhaust gas mass flow rate mcyl, a turbine rotation speed Ntb, and a WGV opening WG. As shown in FIG. 2, the exhaust gas mass flow rate mcyl during the steady operation can be expressed by using an inverse function $Y^{-1}$ of the turbine rotation speed Ntb and WGV opening WG as indicated in Equation (1) below:

$$mcyl = Y^{-1}(Ntb, WG) \qquad (1)$$

When the exhaust gas mass flow rate mcyl is mA in an equilibrium state at point A shown in FIG. 2, that is, in an equilibrium state where WG=X and Ntb=Na, mA can be expressed as indicated in Equation (2) by using Equation (1) above:

$$mcyl = mA = Y^{-1}(Na, X) \qquad (2)$$

The exhaust gas mass flow rate mcyl (=mA) which is calculated by Equation (2) above indicates the sum of the turbine flow rate and WGV flow rate in the equilibrium state at point A. When, in this instance, the WGV is fully closed (WG=0), the total amount indicated by the exhaust gas mass flow rate mcyl flows toward the turbine. Therefore, the turbine flow rate in the equilibrium state at point A is substantially equivalent to the exhaust gas mass flow rate mcyl (=mtA) prevailing when WG=0 at the same turbine rotation speed Ntb (=Na). Thus, the turbine flow rate and WGV flow rate in the equilibrium state can be expressed as indicated in Equations (3) and (4) below by using Equations (1) and (2) above:

Turbine flow rate: $mtA = Y^{-1}(Na, 0)$ (3)

WGV flow rate: $mA - mtA = Y^{-1}(Na, X) - Y^{-1}(Na, 0)$ (4)

Consequently, when the relationship defined for a function Y is stored in the ECU 40, the turbine flow rate and WGV flow rate in a detected equilibrium state (mcyl, Ntb, WG) can be accurately calculated.

Figure 3:
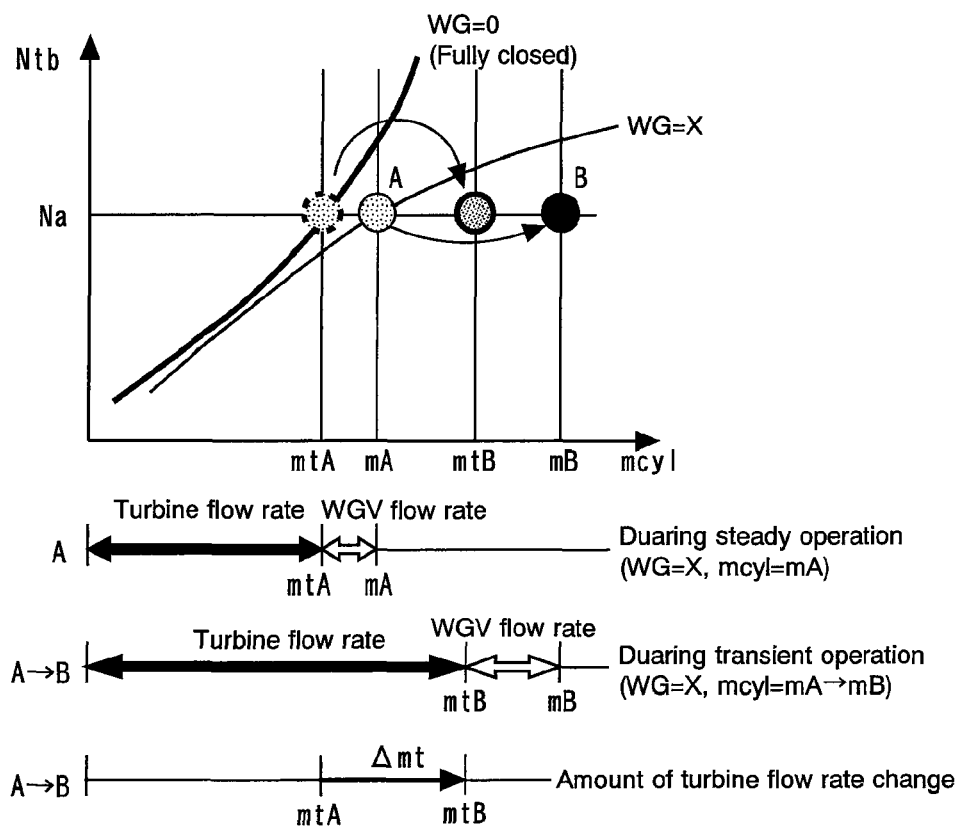
FIG. 3 is a diagram illustrating turbine flow rate changes that are caused by changes in the exhaust gas mass flow rate mcyl.

Next, a method of calculating the turbine flow rate and WGV flow rate during a transient operation in which the exhaust gas mass flow rate mcyl of the internal combustion engine 10 is changed will be described. FIG. 3 is a diagram illustrating turbine flow rate changes that are caused by changes in the exhaust gas mass flow rate mcyl. FIG. 3 shows an exemplary transient state where the exhaust gas mass flow rate mcyl is increased from mA to mB when the WGV opening WG=X and the turbine rotation speed Ntb=Na, that is, while the operating status of the internal combustion engine 10 changes from an equilibrium state at point A to a transient state at point B. It is conceivable that a transient operation in this transient state may be performed, for instance, immediately after the throttle valve 18 is opened.

A comparison between the equilibrium state at point A and the transient state at point B indicates that WG and Ntb remain unchanged in these states. Thus, the turbine flow rate ratio relative to the exhaust gas mass flow rate mcyl remains unchanged when the operating status changes from the equilibrium state to the transient state. Therefore, when the turbine flow rate in the transient state is mtB, the turbine flow rate and WGV flow rate are expressed by Equations (5) and (6) below:

Turbine flow rate: $mtB = mtA \times mB/mA$ (5)

WGV flow rate: $mB - mtB = mB - mtA \times mB/mA$ (6)

As described above, the system according to the first embodiment makes it possible to accurately calculate the turbine flow rate and WGV flow rate during a transient operation in which the exhaust gas mass flow rate mcyl is changed.

The above description assumes that Ntb=Na. However, Ntb during a transient operation varies with time. It is therefore preferred that Ntb during a transient operation be successively estimated in a manner described below and used to calculate the above-mentioned turbine flow rate. More specifically, in the equilibrium state at point A, the drive torque and load torque of the turbine are balanced while Ntb=Na. When the operating status changes from this equilibrium state to the transient state at point B, the turbine flow rate increases. When the amount of such a turbine flow rate increase is Δmt, the drive torque increases in proportion to Δmt, thereby increasing the turbine rotation speed Ntb. This increase in the turbine rotation speed Ntb is proportional to the drive torque. Therefore, when Δmt which is calculated by Equation (7) below is used for calculation by Equation (8) below, the turbine rotation speed Ntb during the transient operation can be successively calculated:

$\Delta mt = mtB - mtA = mtA \times (mB - mA)/mA$ (7)

$Ntb(k+1) = Ntb(k) + K \times \Delta mt/Ntb(k)$ (8)

[Details of Process Performed in First Embodiment]

Figure 4:
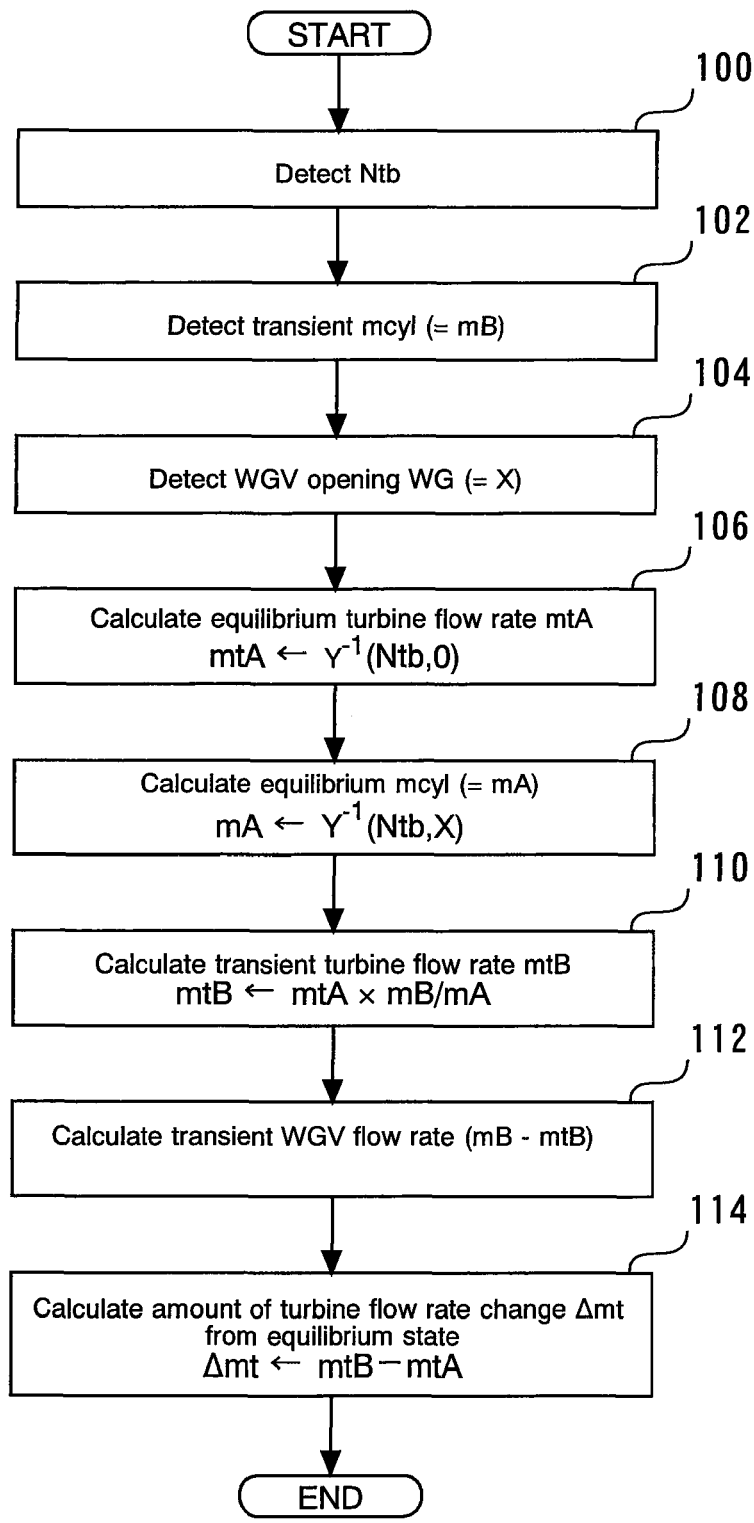
FIG. 4 is a flowchart illustrating a routine that is executed in accordance with a first embodiment of the present invention.

A process performed in the present embodiment will now be described in detail with reference to FIG. 4. FIG. 4 is a flowchart illustrating a routine executed by the ECU 40. This routine is repeatedly executed during a transient operation in which the exhaust gas mass flow rate mcyl is changed while the WGV opening WG remains unchanged.

First of all, the routine shown in FIG. 4 performs step 100 to detect the turbine rotation speed Ntb. Here, more specifically, the turbine rotation speed Ntb (e.g., Na) during the transient state concerning the routine is calculated by substituting Δmt which is calculated in later-described step 112, and the previous value of Ntb into Equation (8).

Next, the routine performs step 102 to detect the exhaust gas mass flow rate mcyl (=mB) corresponding to the transient state concerning the routine. The exhaust gas mass flow rate mcyl is substantially equivalent to the sum of the amount of intake air and the amount of fuel, and the amount of fuel is smaller than the amount of intake air. Thus, the intake air amount of the internal combustion engine 10, which is detected by the air flow meter 38 is detected as the exhaust gas mass flow rate mcyl in the transient state. Next, the routine performs step 104 to detect the WGV opening WG. More specifically, the WGV opening WG (e.g., WG=X) prevailing when the operating status changes from the equilibrium state to the transient state is detected in step 104.

Next, the routine performs step 106 to calculate the turbine flow rate (=mtA) in the equilibrium state by substituting the turbine rotation speed Ntb calculated in step 100 into Equation (3). The routine then performs step 108 to calculate the exhaust gas mass flow rate (=mA) in the equilibrium state by substituting the turbine rotation speed Ntb calculated in step 100 and the WGV opening WG calculated in step 104 into Equation (2).

Next, the routine performs step 110 to calculate the turbine flow rate mtB corresponding to the transient state concerning the routine by substituting mB, mtA, and mA calculated in steps 100, 106, and 108 into Equation (5). The routine then proceeds to step 112 to calculate the WGV flow rate (mtB−mB) corresponding to the transient state concerning the routine by substituting mB and mtB calculated in steps 102 and 110 into Equation (6).

Next, the routine proceeds to step 112 to calculate the amount of turbine flow rate change Δmt from the equilibrium state by substituting mtA and mtB calculated in steps 106 and 110 into Equation (7).

As described above, the system according to the first embodiment makes it possible to successively and accurately calculate the turbine flow rate during a transient operation in which the exhaust gas mass flow rate mcyl is changed while the WGV opening WG is fixed to a predetermined value.

Further, the system according to the first embodiment makes it possible to successively and accurately estimate the turbine rotation speed Ntb during a transient operation in accordance with the amount of turbine flow rate change Δmt from the equilibrium state.

Meanwhile, the first embodiment has been described above with reference to a transient state in which mcyl is changed from mA to mB, WG is equal to X, and Ntb is equal to Na. However, the transient state in which the turbine flow rate can be calculated is not limited to the above-described transient state. More specifically, the above-described routine can be used to surely calculate the turbine flow rate in a transient state in which the exhaust gas mass flow rate mcyl is changed with the WGV opening WG controlled to a fixed value.

In the first embodiment which has been described above, it is assumed that the turbine rotation speed Ntb is used to calculate the turbine flow rate during a transient operation. However, turbine state quantities available for calculation are not limited to the turbine rotation speed Ntb. More specifically, the boost pressure generated by the compressor 201 of the turbocharger 20, the turbine work (energy) having a correlation with the boost pressure, the drive torque, or other value indicating an internal state quantity of the turbine 202 may be used for calculation purposes.

In the first embodiment which has been described above, mcyl corresponds to the "exhaust gas flow rate" according to the first aspect of the present invention; WG corresponds to the "WGV opening" according to the first aspect of the present invention; Ntb corresponds to the "boost pressure correlation value" according to the first aspect of the present invention; mA corresponds to the "virtual exhaust gas flow rate" according to the first aspect of the present invention; mtA corresponds to the "virtual turbine flow rate" according to the first aspect of the present invention; and mtB corresponds to the "turbine flow rate during the transient operation" according to the first aspect of the present invention. The "acquisition means" according to the first aspect of the present invention is implemented when the ECU 40 performs steps 100 to 104; the "virtual turbine flow rate acquisition means" according to the first aspect of the present invention is implemented when the ECU 40 performs step 106; the "virtual exhaust gas flow rate acquisition means" according to the first aspect of the present invention is implemented when the ECU 40 performs step 108; and the "flow rate ratio acquisition means" and "turbine flow rate calculation means" according to the first aspect of the present invention are implemented when the ECU 40 performs step 110.

In the first embodiment which has been described above, the "WGV flow rate calculation means" according to the second aspect of the present invention is implemented when the ECU 40 performs step 112.

In the first embodiment which has been described above, the relationship defined by Equation (1) corresponds to the "steady operation map" according to the third and fourth aspects of the present invention.

In the first embodiment which has been described above, Δmt corresponds to the "turbine flow rate change amount" according to the fifth aspect of the present invention. The "estimation means" according to the fifth aspect of the present invention is implemented when the ECU 40 performs step 114.

Second Embodiment

[Features of Second Embodiment]

A second embodiment of the present invention will now be described with reference to FIGS. 5 and 6. The system according to the second embodiment can be implemented when the hardware configuration shown in FIG. 1 is employed to let the ECU 40 execute a later-described routine shown in FIG. 6.

In the first embodiment which has been described earlier, the turbine flow rate is calculated successively and accurately during a transient operation in which the exhaust gas mass flow rate mcyl is changed while the WGV opening WG is controlled to a fixed value. In the second embodiment, however, the turbine flow rate is calculated accurately during a transient operation in which the WGV opening WG is changed while the exhaust gas mass flow rate mcyl remains unchanged.

Figure 5:
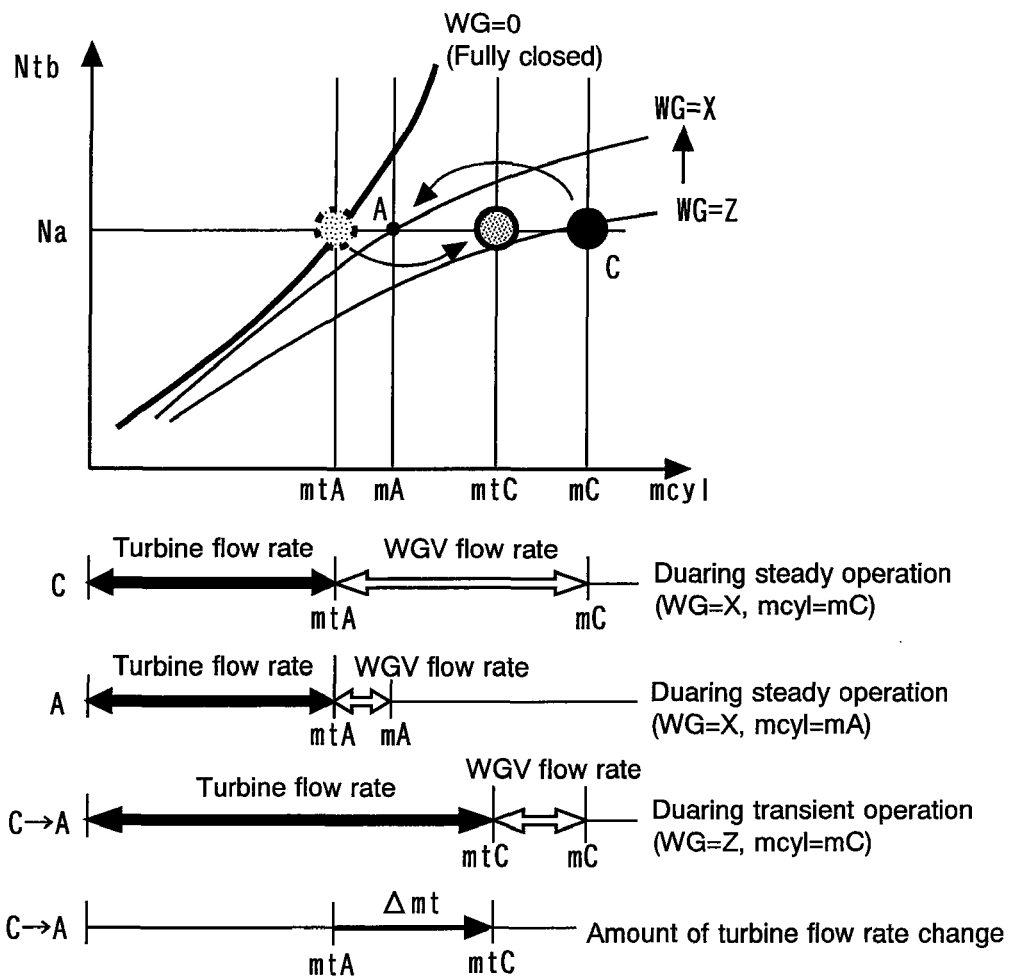
FIG. 5 is a diagram illustrating turbine flow rate changes that are caused by changes in the WGV opening WG.

FIG. 5 is a diagram illustrating turbine flow rate changes that are caused by changes in the WGV opening WG. FIG. 5 shows an exemplary transient state where the WGV opening WG is decreased from Z to X while the exhaust gas mass flow rate mcyl=mc and the turbine rotation speed Ntb=Na, that is, where the operating status of the internal combustion engine 10 is changed from an equilibrium state at point C to a transient state at point A.

The equilibrium state at point A is a state where a steady operation is performed, as described in connection with the first embodiment, while Ntb=Na, WG=X, and mcyl=mA. Therefore, the turbine flow rate in such a state is mtA and the WGV flow rate is (mA−mtA).

Similarly, the equilibrium state at point C is a state where a steady operation is performed while Ntb=Na, WG=Z, and mcyl=mC. Therefore, the turbine flow rate in such a state is mtA and the WGV flow rate is (mC−mtA).

The transient state at point A is a transient state where the WGV opening WG is decreased from Z to X in the equilibrium state at point C at which Ntb=Na, WG=Z, and mcyl=mC. In other words, this transient state is a transient state where WG in the equilibrium state at point A prevails while mcyl in the equilibrium state at point C is observed. Thus, the transient state at point A is substantially equivalent to a transient state in which mcyl is changed from mA to mC in an equilibrium state where Ntb=Na, WG=X, and mcyl=mA. Therefore, when the turbine flow rate in this transient state is mtC, the turbine flow rate and WGV flow rate can be expressed by Equations (9) and (10) below with mtB and mB in Equations (5) and (6) substituted by mtC and mC, respectively.

Turbine flow rate: $mtC = mtA \times mC/mA$ (9)

WGV flow rate: $mC - mtC = mC - mtA \times mC/mA$ (10)

As described above, a transient operation in which the WGV opening WG is changed can be replaced by a transient operation in which the exhaust gas mass flow rate mcyl is changed. Consequently, the turbine flow rate and WGV flow rate can be accurately calculated by performing calculations in the same manner as described in connection with the first embodiment.

[Details of Process Performed in Second Embodiment]

A process performed in the present embodiment will now be described in detail with reference to FIG. 6. FIG. 6 is a flowchart illustrating a routine executed by the ECU 40. This routine is repeatedly executed during a transient operation in which the WGV opening WG is changed while the exhaust gas mass flow rate mcyl remains unchanged.

Figure 6:
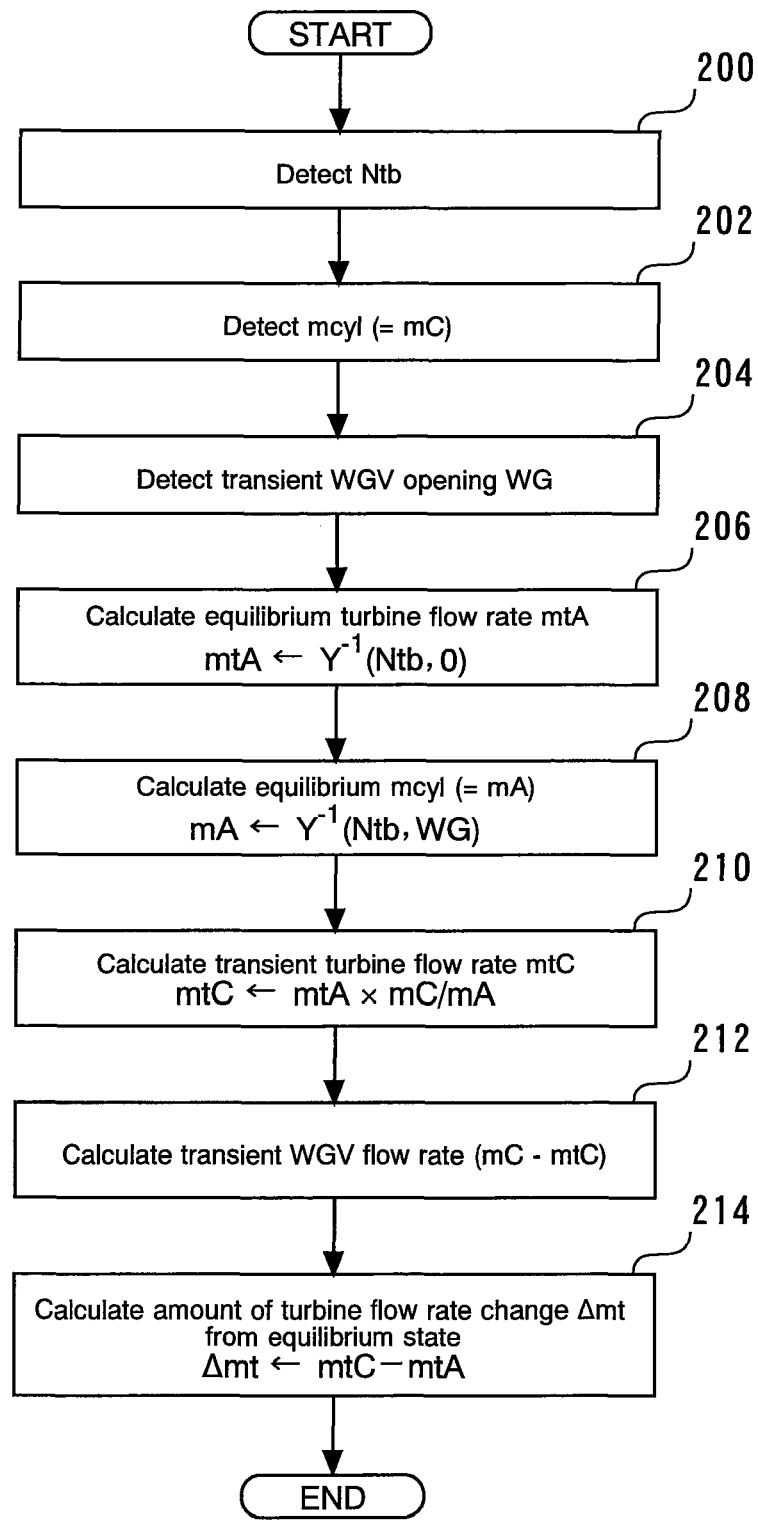
FIG. 6 is a flowchart illustrating a routine that is executed in accordance with a second embodiment of the present invention.

First of all, the routine shown in FIG. 6 performs step 200 to detect the turbine rotation speed Ntb. Here, more specifically, the routine performs the same process as in step 100.

Next, the routine performs step 202 to detect the exhaust gas mass flow rate mcyl. More specifically, the routine detects a fixed value of mcyl (e.g., mcyl=mC) that prevails during a period from the steady state to the transient state. The routine then proceeds to step 204 to detect the WGV opening WG corresponding to the transient state concerning the routine.

Next, the routine performs step 206 to calculate the turbine flow rate (=mtA) in an equilibrium state. More specifically, the routine performs the same process as in step 106. The routine then proceeds to step 208 to calculate the exhaust gas mass flow rate (=mA) in the equilibrium state by substituting Ntb acquired in step 200 and WG acquired in step 204 into Equation (1).

Next, the routine proceeds to step 210 to calculate the turbine flow rate mtC corresponding to the transient state concerning the routine by substituting mC, mtA, and mA calculated in steps 200, 206, and 208 into Equation (9). The routine then proceeds to step 212 to calculate the WGV flow rate (mtC−mC) corresponding to the transient state concerning the routine by substituting mC and mtC calculated in steps 202 and 210 into Equation (10).

Next, the routine proceeds to step 214 to calculate the amount of turbine flow rate change Δmt from the equilibrium state by substituting mtA and mtC calculated in steps 206 and 210 into Equation (7).

As described above, the system according to the second embodiment makes it possible to successively and accurately calculate the turbine flow rate during a transient operation during which the WGV opening WG changes while the exhaust gas mass flow rate mcyl is maintained at a predetermined value mC.

Further, the system according to the second embodiment makes it possible to successively and accurately estimate the turbine rotation speed Ntb during a transient operation in accordance with the amount of turbine flow rate change Δmt from the equilibrium state.

Meanwhile, the second embodiment has been described above to explain about a method of calculating the turbine flow rate during a transient operation in which the WGV opening WG is changed while the exhaust gas mass flow rate mcyl is controlled to a fixed value (=mC). Alternatively, however, the turbine flow rate may be calculated during a transient operation in which WG and mcyl are both changed, that is, in combination with a transient operation in which mcyl is changed as described in connection with the first embodiment. This alternative can be implemented by allowing the routine shown in FIG. 6 to perform step 102 in place of step 202. When this alternative is implemented, the turbine flow rate can be accurately calculated even during a transient operation in which WG and mcyl are both changed.

In the second embodiment which has been described above, it is assumed that the turbine flow rate during a transient operation is calculated by using the turbine rotation speed Ntb. However, turbine state quantities available for calculation are not limited to the turbine rotation speed Ntb. More specifically, the boost pressure generated by the compressor 201 of the turbocharger 20, the turbine work (energy) having a correlation with the boost pressure, the drive torque, or other value indicating an internal state quantity of the turbine 202 may be used for calculation purposes.

In the second embodiment which has been described above, mcyl corresponds to the "exhaust gas flow rate" according to the first aspect of the present invention; WG corresponds to the "WGV opening" according to the first aspect of the present invention; Ntb corresponds to the "boost pressure correlation value" according to the first aspect of the present invention; mA corresponds to the "virtual exhaust gas flow rate" according to the first aspect of the present invention; mtA corresponds to the "virtual turbine flow rate" according to the first aspect of the present invention; and mtB corresponds to the "turbine flow rate during the transient operation" according to the first aspect of the present invention. The "acquisition means" according to the first aspect of the present invention is implemented when the ECU 40 performs steps 200 to 204; the "virtual turbine flow rate acquisition means" according to the first aspect of the present invention is implemented when the ECU 40 performs step 206; the "virtual exhaust gas flow rate acquisition means" according to the first aspect of the present invention is implemented when the ECU 40 performs step 208; and the "flow rate ratio acquisition means" and "turbine flow rate calculation means" according to the first aspect of the present invention are implemented when the ECU 40 performs step 210.

In the second embodiment which has been described above, the "WGV flow rate calculation means" according to the second aspect of the present invention is implemented when the ECU 40 performs step 212.

In the second embodiment which has been described above, the relationship defined by Equation (1) corresponds to the "steady operation map" according to the third and fourth aspects of the present invention.

In the second embodiment which has been described above, Δmt corresponds to the "turbine flow rate change amount" according to the fifth aspect of the present invention. The "estimation means" according to the fifth aspect of the present invention is implemented when the ECU 40 performs step 114.

Third Embodiment

[Features of Third Embodiment]

A third embodiment of the present invention will now be described with reference to FIGS. 7 and 8. The system according to the third embodiment can be implemented when the hardware configuration shown in FIG. 1 is employed to let the ECU 40 execute a later-described routine shown in FIG. 8.

In the first and second embodiments which have been described earlier, the turbine flow rate during a transient operation is calculated accurately. In the third embodiment, however, an exhaust gas temperature prevailing after the confluence of exhaust gas flowing toward the turbine 202 and exhaust gas flowing toward the WGV 28 (hereinafter referred to as the "turbine downstream gas temperature") is accurately estimated by using the flow rate ratio of a calculated turbine flow rate to the exhaust gas mass flow rate mcyl.

Figure 7:
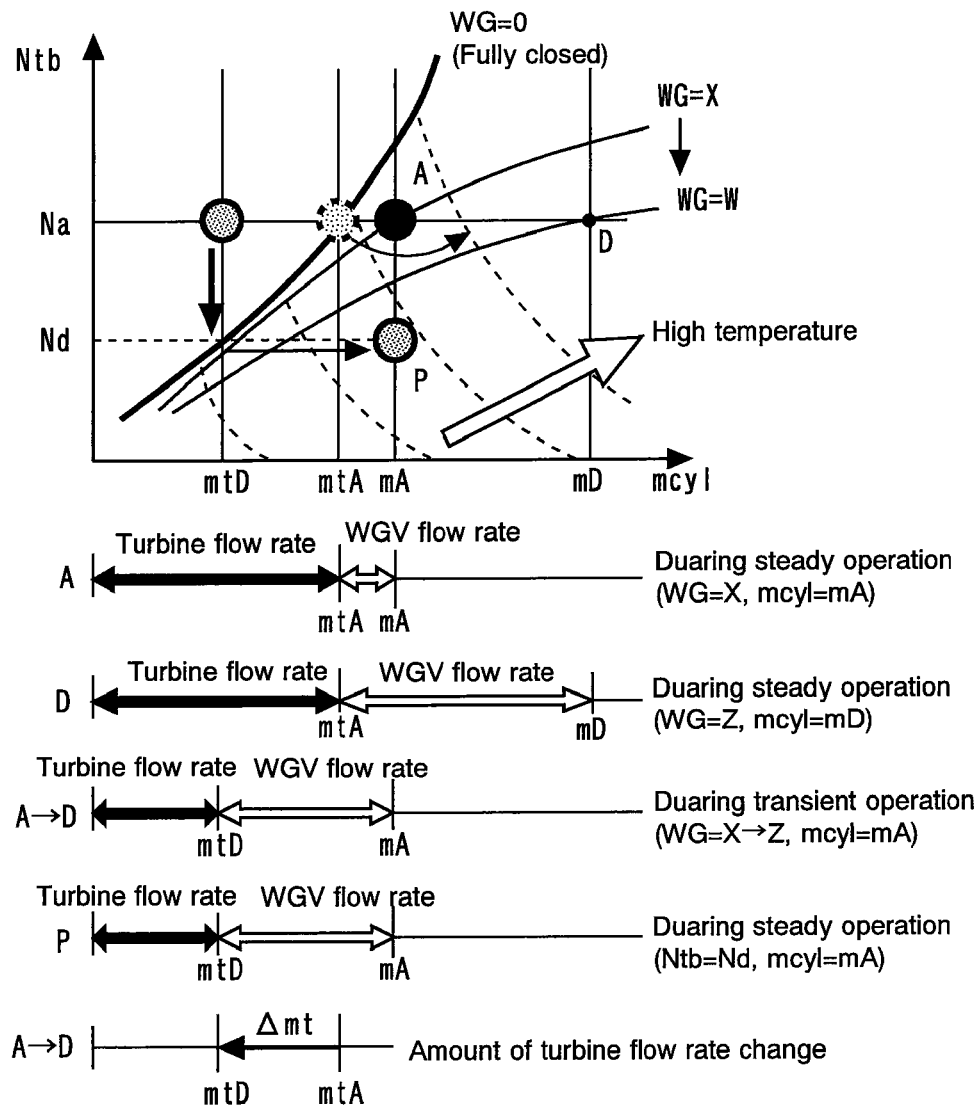
FIG. 7 is a diagram illustrating the relationship during a steady operation between the turbine rotation speed Ntb, the exhaust gas mass flow rate mcyl, and a turbine downstream gas temperature.

FIG. 7 is a diagram illustrating the relationship during a steady operation of the internal combustion engine 10 between the turbine rotation speed Ntb, the exhaust gas mass flow rate mcyl, and the turbine downstream gas temperature. As indicated in FIG. 7, the turbine downstream gas temperature is determined in accordance with Ntb and mcyl during a steady operation during which Ntb and mcyl are in equilibrium. Therefore, when the turbine downstream gas temperature is Tex, Equation (11) below is established:

$$Tex = T(Ntb, mcyl) \tag{11}$$

Referring to FIG. 7, a case where the operating status of the internal combustion engine 10 has changed from an equilibrium state at point A to a transient state at point D, or more specifically, a transient state in which the WGV opening WG is increased from X to W while mcyl=mA and Ntb=Na, will now be discussed.

First of all, the equilibrium state at point A is a state where a steady operation is performed while Ntb=Na, WG=X, and mcyl=mA, as described in connection with the first embodiment. Thus, the turbine flow rate in such a state is mtA and the WGV flow rate is (mA−mtA).

Similarly, the equilibrium state at point D is a state where a steady operation is performed while Ntb=Na, WG=Z, and mcyl=mD. Therefore, the turbine flow rate in such a state is mtA and the WGV flow rate is (mD−mtA).

The transient state at point D is a transient state where Ntb=Na, WG=W, and mcyl=mA. Therefore, if the turbine flow rate in this transient state is mtD, the turbine flow rate and WGV flow rate can be expressed by Equations (12) and (13) below with mtC, mC, and mA in Equations (9) and (10) substituted by mtD, mA, and mD, respectively:

$$\text{Turbine flow rate: } mtD = mtA \times mA/mD \tag{12}$$

$$WGV \text{ flow rate: } mA - mtD = mA - mtA \times mA/mD \tag{13}$$

As shown in FIG. 7, the turbine flow rate (=mtD) in the transient state at point D prevails in an equilibrium state when the turbine is in a state where Ntb=Nd. Further, the exhaust gas mass flow rate mcyl (=mA) in the transient state prevails in the above turbine state when the operating status is an equilibrium state at point P. Therefore, it can be said that the exhaust gas status in the transient state at point D is equivalent to the exhaust gas status in the equilibrium state at point P. Consequently, the turbine downstream gas temperature Tex in the transient state can be accurately estimated by substituting Ntb=Nd and mcyl=mA into Equation (11).

[Details of Process Performed in Third Embodiment]

A process performed in the present embodiment will now be described in detail with reference to FIG. 8. FIG. 8 is a flowchart illustrating a routine executed by the ECU 40. This routine is repeatedly executed during a transient operation of the internal combustion engine 10.

Figure 8:
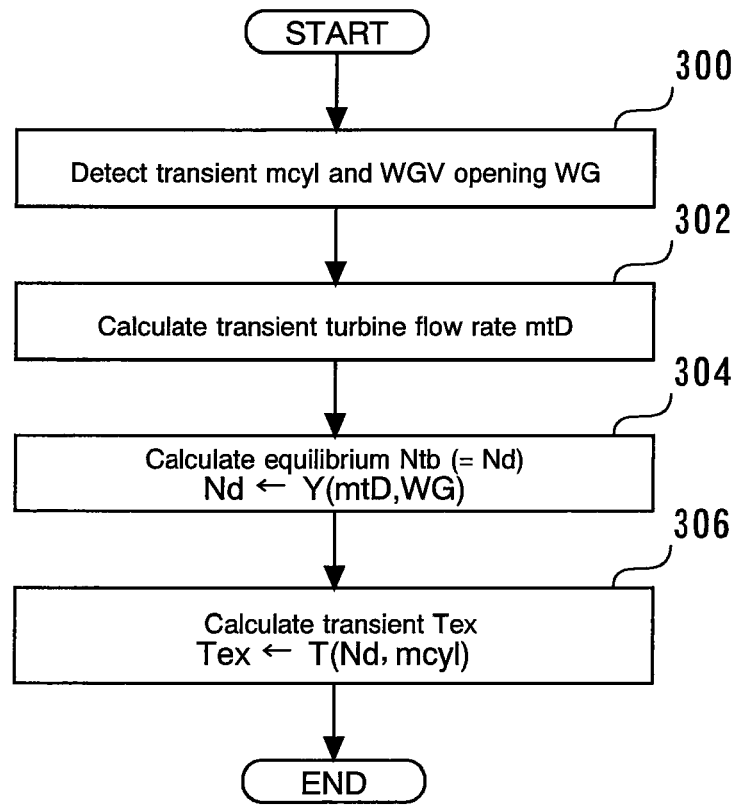
FIG. 8 is a flowchart illustrating a routine that is executed in accordance with a third embodiment of the present invention.

First of all, the routine shown in FIG. 8 performs step 300 to calculate the turbine flow rate (=mtD) corresponding to the transient state concerning the routine, the exhaust gas mass flow rate mcyl, and the WGV opening WG. More specifically, the routine performs the same process as in steps 200 to 210.

Next, the routine proceeds to step 302 to calculate the turbine rotation speed Ntb at which the turbine flow rate is mtD in the equilibrium state. More specifically, the routine calculates Ntb (=Nd) corresponding to WG and mtD calculated in step 300 by using a positive function Y of $Y^{-1}$ in Equation (1).

Next, the routine proceeds to step 304 to calculate the turbine downstream gas temperature Tex in the transient state. More specifically, the routine is performed by substituting mcyl calculated in step 300 and Nd calculated in step 302 into Equation (13).

As described above, the third embodiment makes it possible to accurately estimate the turbine downstream gas temperature Tex during a transient operation in accordance with the calculated turbine flow rate during the transient operation and the exhaust gas mass flow rate mcyl prevailing at such a turbine flow rate.

In the third embodiment which has been described above, mcyl corresponds to the "exhaust gas flow rate" according to the first aspect of the present invention; WG corresponds to the "WGV opening" according to the first aspect of the present invention; Ntb corresponds to the "boost pressure correlation value" according to the first aspect of the present invention; and mtD corresponds to the "turbine flow rate during the transient operation" according to the first aspect of the present invention. The "acquisition means" according to the first aspect of the present invention is implemented when the ECU 40 performs step 300; and the "turbine flow rate calculation means" according to the first aspect of the present invention is implemented when the ECU 40 performs step 302.

In the third embodiment which has been described above, Tex corresponds to the "exhaust gas temperature" according to the eighth aspect of the present invention; Nd corresponds to the "virtual boost pressure correlation value" according to the eighth aspect of the present invention; and the relationship defined by Equation (11) corresponds to the "temperature map" according to the eighth aspect of the present invention. The "boost pressure correlation value acquisition means" according to the eighth aspect of the present invention is implemented when the ECU 40 performs step 304; and the "exhaust gas temperature identification means" according to the eighth aspect of the present invention is implemented when the ECU 40 performs step 306.

In the third embodiment which has been described above, the relationship defined by Equation (1) corresponds to the "steady operation map" according to the eighth aspect of the present invention.

DESCRIPTION OF REFERENCE CHARACTERS

10 . . . Internal combustion engine
12 . . . Intake path
14 . . . Air cleaner
18 . . . Throttle valve
20 . . . Turbocharger
201 . . . Compressor
202 . . . Turbine
203 . . . Connecting shaft
22 . . . Pressure sensor
24 . . . Exhaust path
26 . . . Exhaust bypass path
28 . . . WGV (wastegate valve)
30 . . . Actuator
32 . . . SC catalyst
34 . . . UF catalyst
36 . . . Muffler
38 . . . Air flow meter
40 . . . ECU (electronic control unit)

The invention claimed is:

1. A control device for an internal combustion engine with a turbocharger, the control device comprising:
    an exhaust bypass path that is installed in an exhaust system for the internal combustion engine to bypass the turbocharger;
    a WGV that is installed in the exhaust bypass path and capable of arbitrarily adjusting the opening thereof upon receipt of an operation request from the internal combustion engine;
    acquisition means for acquiring, during a transient operation of the internal combustion engine, an exhaust gas flow rate of exhaust gas discharged from the internal combustion engine, a WGV opening, and a boost pressure correlation value having a correlation with boost pressure of the internal combustion engine as a transient exhaust gas flow rate, a transient WGV opening, and a transient boost pressure correlation value, respectively;
    virtual exhaust gas flow rate acquisition means for acquiring, as a virtual exhaust gas flow rate, a virtual value indicative of the exhaust gas flow rate prevailing when the transient boost pressure correlation value and the transient WGV opening are achieved during a steady operation of the internal combustion engine;
    virtual turbine flow rate acquisition means for acquiring, as a virtual turbine flow rate, a virtual value indicative of a flow rate of exhaust gas passing through a turbine for the turbocharger (hereinafter referred to as a turbine flow rate), the virtual value prevailing when the transient boost pressure correlation value and the transient WGV opening are achieved during the steady operation;
    flow rate ratio acquisition means for acquiring a flow rate ratio of the virtual turbine flow rate to the virtual exhaust gas flow rate; and
    turbine flow rate calculation means for calculating the turbine flow rate during the transient operation by applying the flow rate ratio to the transient exhaust gas flow rate.

2. The control device according to claim 1, further comprising:
    WGV flow rate calculation means for acquiring a value obtained by subtracting the turbine flow rate during the transient operation from the transient exhaust gas flow rate as the flow rate of exhaust gas passing through the WGV (hereinafter referred to as a WGV flow rate) during the transient operation.

3. The control device according to claim 1, wherein the virtual exhaust gas flow rate acquisition means includes steady operation map storage means for storing a steady operation map defining a relationship during the steady operation between the boost pressure correlation value, the WGV opening, and the exhaust gas flow rate; and wherein the virtual exhaust gas flow rate acquisition means uses the steady operation map to acquire an exhaust gas flow rate corresponding to the transient boost pressure correlation value and the transient WGV opening as the virtual exhaust gas flow rate.

4. The control device according to claim 1,
wherein the virtual turbine flow rate acquisition means includes steady operation map storage means for storing a steady operation map defining a relationship during the steady operation between the boost pressure correlation value, the WGV opening, and the exhaust gas flow rate; and
wherein the virtual turbine flow rate acquisition means uses the steady operation map to acquire an exhaust gas flow rate corresponding to the transient boost pressure correlation value and the WGV opening of a fully-closed as the virtual turbine flow rate.

5. The control device according to claim 1,
wherein the boost pressure correlation value is a turbine rotation speed of the turbocharger; and
wherein the acquisition means includes:
turbine flow rate change amount acquisition means for acquiring a value obtained by subtracting the virtual turbine flow rate from the turbine flow rate during the transient operation as a turbine flow rate change amount, and
estimation means for estimating the turbine rotation speed in accordance with the turbine flow rate change amount.

6. The control device according to claim 1, wherein the transient operation includes an operation in which the exhaust gas flow rate changes while the WGV opening remains unchanged.

7. The control device according to claim 1, wherein the transient operation includes an operation in which the WGV opening changes while the exhaust gas flow rate remains unchanged.

8. The control device according to claim 1, further comprising:
temperature map storage means for storing a temperature map defining a relationship during a steady operation of the internal combustion engine between the boost pressure correlation value, the exhaust gas flow rate, and an exhaust gas temperature prevailing downstream of the turbocharger;
virtual boost pressure correlation value acquisition means for acquiring, as a virtual boost pressure correlation value, a virtual value indicative of a boost pressure correlation value prevailing when the turbine flow rate during the transient operation and the transient exhaust gas flow rate are achieved during the steady operation; and
exhaust gas temperature identification means for identifying, as the exhaust gas temperature prevailing during the transient operation, the temperature of an associated point of the temperature map by using the virtual boost pressure correlation value and the transient exhaust gas flow rate.

9. The control device according to claim 8,
wherein the virtual boost pressure correlation value acquisition means includes steady operation map storage means for storing a steady operation map defining a relationship during the steady operation between the boost pressure correlation value, the WGV opening, and the exhaust gas flow rate; and
wherein the virtual boost pressure correlation value acquisition means acquires, as the virtual boost pressure correlation value, a boost pressure correlation value corresponding to a point at which the WGV opening is fully closed and the exhaust gas flow rate is equal to the turbine flow rate during the transient operation, the point being on the steady operation map.

10. A control device for an internal combustion engine with a turbocharger, the control device comprising:
an exhaust bypass path that is installed in an exhaust system for the internal combustion engine to bypass the turbocharger;
a WGV that is installed in the exhaust bypass path and capable of arbitrarily adjusting the opening thereof upon receipt of an operation request from the internal combustion engine;
acquisition device for acquiring, during a transient operation of the internal combustion engine, an exhaust gas flow rate of exhaust gas discharged from the internal combustion engine, a WGV opening, and a boost pressure correlation value having a correlation with boost pressure of the internal combustion engine as a transient exhaust gas flow rate, a transient WGV opening, and a transient boost pressure correlation value, respectively;
virtual exhaust gas flow rate acquisition device for acquiring, as a virtual exhaust gas flow rate, a virtual value indicative of the exhaust gas flow rate prevailing when the transient boost pressure correlation value and the transient WGV opening are achieved during a steady operation of the internal combustion engine;
virtual turbine flow rate acquisition device for acquiring, as a virtual turbine flow rate, a virtual value indicative of a flow rate of exhaust gas passing through a turbine for the turbocharger (hereinafter referred to as a turbine flow rate), the virtual value prevailing when the transient boost pressure correlation value and the transient WGV opening are achieved during the steady operation;
flow rate ratio acquisition device for acquiring a flow rate ratio of the virtual turbine flow rate to the virtual exhaust gas flow rate; and
turbine flow rate calculation device for calculating the turbine flow rate during the transient operation by applying the flow rate ratio to the transient exhaust gas flow rate.

* * * * *